(12) United States Patent
Liu et al.

(10) Patent No.: US 9,829,501 B2
(45) Date of Patent: Nov. 28, 2017

(54) ROTATIONAL SENSING BASED ON INDUCTIVE SENSING

(71) Applicant: Texas Instruments Incorporated, Dallas, TX (US)

(72) Inventors: Dongtai Liu, Fremont, CA (US); Evgeny Fomin, San Carlos, CA (US); George Pieter Reitsma, Redwood City, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 282 days.

(21) Appl. No.: 14/687,690

(22) Filed: Apr. 15, 2015

(65) Prior Publication Data

US 2015/0323348 A1 Nov. 12, 2015

Related U.S. Application Data

(60) Provisional application No. 61/984,191, filed on Apr. 25, 2014.

(51) Int. Cl.
*G01B 7/14* (2006.01)
*G01P 3/49* (2006.01)
(Continued)

(52) U.S. Cl.
CPC .............. *G01P 3/49* (2013.01); *G01D 5/2006* (2013.01); *G01P 3/487* (2013.01)

(58) Field of Classification Search
CPC ...... G01D 5/145; G01D 5/2006; G01R 33/02; G01P 3/487
(Continued)

(56) References Cited

U.S. PATENT DOCUMENTS 4,329,634 A 5/1982 Dunfield et al.
5,637,972 A 6/1997 Randall et al.
(Continued)

FOREIGN PATENT DOCUMENTS

SU 1107143 A 7/1984
WO WO2012134644 10/2012

OTHER PUBLICATIONS

PCT Search Report Application No. PCT/US 2015/027696, dated Sep. 10, 2015.

*Primary Examiner* — Reena Aurora
(74) *Attorney, Agent, or Firm* — Andrew Viger; Charles A. Brill; Frank D. Cimino

(57) ABSTRACT

A rotational sensing system is adaptable to sensing motor rotation based on eddy current sensing. An axial target surface is incorporated with the motor rotor, and includes one or more conductive target segment(s). An inductive sensor is mounted adjacent the axial target surface, and includes one or more inductive sense coil(s), such that rotor rotation rotates the target segment(s) laterally under the sense coil(s). An inductance-to-digital converter (IDC) drives sensor excitation current to project a magnetic sensing field toward the rotating axial target surface. Sensor response is characterized by successive sensor phase cycles that cycle between $L_{MIN}$ in which a sense coil is aligned with a target segment, and $L_{MAX}$ in which the sense coil is misaligned. The number of sensor phase cycles in a rotor rotation cycle corresponds to the number of target segments. The IDC converts sensor response measurements from successive sensor phase cycles into rotational data.

20 Claims, 3 Drawing Sheets

(51) Int. Cl.
*G01D 5/20* (2006.01)
*G01P 3/487* (2006.01)

(58) Field of Classification Search
USPC ........................................ 324/207.17, 207.15
See application file for complete search history.

(56) References Cited

U.S. PATENT DOCUMENTS

| | | | | |
|---|---|---|---|---|
| 6,498,409 | B1* | 12/2002 | Collier-Hallman | G01D 5/145 |
| | | | | 310/68 B |
| 8,723,512 | B1* | 5/2014 | Burdette | G01B 7/14 |
| | | | | 324/174 |
| 8,736,258 | B2* | 5/2014 | Trontelj | G01D 5/145 |
| | | | | 324/207.25 |
| 2009/0115408 | A1 | 5/2009 | West et al. | |

* cited by examiner

ROTATIONAL SENSING BASED ON INDUCTIVE SENSING

CROSS-REFERENCE TO RELATED APPLICATIONS

Priority is claimed under USC §119(e) to U.S. Provisional Application 61/984,191, filed 25 Apr. 2014.

BACKGROUND

Technical Field

This Patent Document relates generally to rotational sensing for angle, frequency, direction, such as used for sensing motor (generator) rotation.

Related Art

Electric motors include a rotor that rotates within a stationary stator. Either the rotor or stator is formed with permanent magnets, and the other component is formed with current-carrying windings. As an example, stepper motors typically use a magnetic rotor with stator windings.

In implementations where the rotor is formed of magnetic material, motor current drive to the stator windings generates a rotating magnetic field that completes one revolution in one cycle of the stator currents, with a rotor angular velocity that depends on the frequency of the current drive.

Motor drive systems can be designed for adjustable speed control, and bi-directional motor rotation. Providing motor control requires some system for sensing motor rotation information, such as rotational frequency, angle and direction. However, rotational sensing systems for stepper and other motor applications are susceptible to EMI (electromagnetic interference) from the stator magnetic field coupled into the sensing system.

While this Background information is presented in the context of electric motors, the present Disclosure is not limited to such applications, but is more generally directed to rotational sensing for angle, frequency and direction.

BRIEF SUMMARY

This Brief Summary is provided as a general introduction to the Disclosure provided by the Detailed Description and Drawings, summarizing some aspects and features of the Disclosure. It is not a complete overview of the Disclosure, and should not be interpreted as identifying key elements or features of the invention, or otherwise characterizing or delimiting the scope of the invention disclosed in this Patent Document.

The Disclosure describes apparatus and methods for rotational sensing with inductive sensor(s) and a rotating axial target surface, such as can be adapted for use in a motor applications, and in particular, positioner/stepper motors.

According to aspects of the Disclosure, a rotational sensing methodology is adaptable for use in sensing rotation of a rotor, and useable in a rotational sensing system that includes an axial target surface configured for axial rotation with the rotor, and including at least one conductive target segment, and an inductive sensor mounted adjacent the axial target surface, and including at least one inductive sense coil that is substantially parallel to and spaced from the axial target surface, such that rotor rotation causes the target segment to rotate laterally under the sense coil each rotor rotation cycle.

The methodology includes driving excitation current to the sense coil to project a time-varying magnetic sensing field (B-field) toward the axial target surface, thereby inducing eddy currents in the target segment as it rotates under the sense coil. In response to the rotation of the at least one target segment relative to the at least one sense coil and its projected B-field, the inductive sensor generates a sensor response characterized by a sensor phase cycle: (a) the sensor phase cycle initiates at a phase_cycle_$L_{MIN}$ in which the sense coil aligned with the target segment to output a minimum sensor response $L_{MIN}$ corresponding to maximum induced eddy current; (b) the sensor phase cycle transitions through a phase_cycle_$L_{MAX}$ in which the sense coil is misaligned with the target segment to output a maximum sensor response $L_{MAX}$ corresponding to minimum induced eddy current, and (c) the sensor phase cycle ends with the initiation of a next sensor phase cycle at phase_cycle_$L_{MIN}$; where (d) the number of sensor phase cycles in a rotor rotation cycle corresponds to the number of target segments.

The methodology further includes: (a) acquiring sensor response measurements corresponding to sensor response for the at least one sense coil in successive sensor phase cycles including phase_cycle_$L_{MIN}$ and phase_cycle_$L_{MAX}$; and (b) converting the sensor response measurements to sensor response data representative of rotation information for the rotating axial target surface that correlates to the sensor response measurements. Sensor response data can correspond to at least one of rotational frequency and rotational angle In various embodiments, the axial target surface can include multiple target segments evenly spaced on the axial target surface, and the inductive sensor can include multiple sense coils, in number equal to or less than the number of target segments, and arranged relative to the multiple target segments such that sensor phase cycles are synchronized, so that sensor responses are synchronized. The multiple sense coils and the multiple target segments are configured such that the sensor response from the multi-coil inductive sensor throughout a rotor rotation cycle is a substantially sinusoidal sensor response signal that cycles between phase_cycle_$L_{MIN}$ and phase_cycle_$L_{MAX}$ in a succession of sensor 360° phase cycles. The inductive sensor can include at least one sense coil pair with first and second sense coils wound with opposite polarity, such that the sensor response of the paired sense coils throughout a rotor rotation cycle is a substantially sinusoidal sensor response signal that cycles between phase_cycle_$L_{MIN}$ and phase_cycle_$L_{MAX}$ as a succession of sensor 360° phase cycles. The inductive sensor can include at least one set of I and Q sense coils arranged relative to the at least one target segment such that the respective sensor I and Q phase cycles are offset by an IQ phase offset, such that, for rotation in one direction, the sensor I phase cycle lags the sensor Q phase cycle, and for rotation in the other direction, the sensor I phase cycle leads the sensor Q phase cycle, thereby enabling converting the I and Q sensor response measurements to sensor response data corresponding to rotation direction information for the rotating axial target surface.

Other aspects and features of the invention claimed in this Patent Document will be apparent to those skilled in the art from the following Disclosure.

BRIEF DESCRIPTION OF THE DRAWINGS

FIG. 2A illustrates paired sense coils 31A/31B aligned with target segments 21/22, and paired sense coils 32A/32B aligned with target segments 23/24.

FIG. 3A illustrates separate I and Q paired sense coils 31_IA/31_IB and 32_QA/32_QB (oppositely wound) arranged with an IQ phase offset of one quarter of the sensor I and Q 360° phase cycle, with I sense coils 31_IA/31_IB respectively aligned with target segments 21/23, and the Q sense coils 32_QA/32_QB respectively offset by the IQ offset relative to target segments 22/24; and FIG. 3B illustrates example waveforms 35I and 35Q with a one quarter IQ phase offset, cycling between LMIN and LMAX in successive sinusoidal sensor phase cycles, for clockwise rotation with 35I lagging 35Q, and for counterclockwise rotation with 35I leading 35Q.

DETAILED DESCRIPTION

This Description and the Drawings constitute a Disclosure of example embodiments and applications that illustrate various features and advantages of rotational sensing with inductive sensor(s) and rotating axial target surface.

In brief overview, a rotational sensing system is adaptable to sensing motor rotation based on eddy current sensing. An axial target surface is mounted to the motor rotor, and includes one or more conductive target segment(s). An inductive sensor is mounted adjacent the axial target surface, and includes one or more inductive sense coil(s), such that rotor rotation rotates the target segment(s) laterally under the sense coil(s). An inductance-to-digital conversion (IDC) unit drives sensor excitation current to project a magnetic sensing field (B-field) toward the rotating axial target surface. Sensor response is characterized by successive sensor phase cycles that cycle between phase_cycle_$L_{MIN}$ in which a sense coil is aligned with a target segment, and phase_cycle_$L_{MAX}$ in which the sense coil is misaligned. The number of sensor phase cycles in a rotor rotation cycle corresponds to the number of target segments. The IDC converts sensor response measurements from successive sensor phase cycles into rotational data/information. In example embodiments, oppositely-wound paired sense coils reduce susceptibility to common mode EMI, and I and Q paired sense coils that are phase shifted (IQ phase offset) to enable sensing rotational direction.

Figure 1:
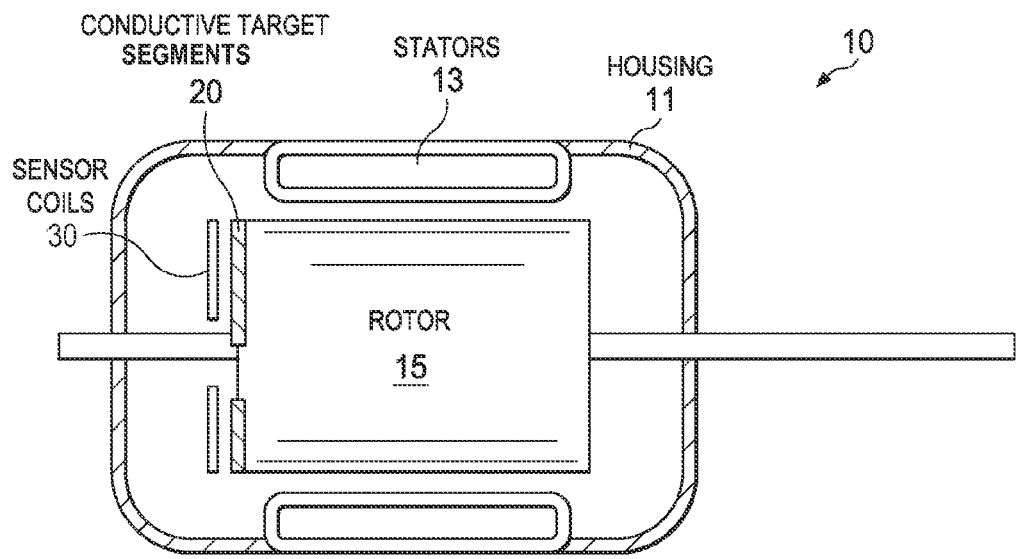
FIG. 1 illustrates an example functional embodiment of a rotational sensing system adapted for use in an example motor application (such as a positioner/stepper motor), and including an axial target surface 20 and inductive sensor 30.

FIG. 1 illustrates an example functional embodiment of a rotational sensing system adapted for use in an example motor application, and positioner/stepper motor in particular.

A motor 10 is functionally illustrated with a housing 11, stators 13 and a rotor 15 configured for rotor rotation about a rotor shaft. For the example stepper motor application, the rotor is constructed with permanent magnets, and the stators include stator windings, that are driven by the motor drive system to generate the stator magnetic field drives motor/rotor rotation.

A rotational sensing system according to this disclosure is incorporated into motor 10, and adapted to sense rotation of rotor 15. Example embodiments of rotational sensing according to this Disclosure are functionally illustrated in FIGS. 2A/2B, including paired sense coils that are oppositely wound to reduce susceptibility to common mode EMI, and FIG. 3A, including I and Q paired sense coils that are phase shifted to enable sensing rotational direction.

The rotational sensing system includes an axial target surface 20 incorporated for rotation with rotor 15, and an inductive sensor 30 (non-rotating) mounted parallel to and spaced from rotating axial target surface 20. Axial target surface 20 can include one or more conductive target segments. Sensor 30 can include one or more sense coils, parallel to and spaced from axial target surface 20. In various embodiments, the target segments can be evenly spaced around the axial target surface, and multiple sense coils can be paired (to reduce susceptibility to common mode EMI), as in the example embodiments in FIGS. 2A/2B/2C and FIGS. 3A/3B, and/or arranged symmetrically relative to the target segments to increase readout/measurement magnitude, as in the example embodiment in FIGS. 2A/2B/2C, and/or arranged with an IQ offset to enable sensing rotational direction, as in the example embodiment in FIGS. 3A/3B.

Axial target surface 20 is incorporated into motor 10 for axial rotation with rotor 15. As illustrated, axial target surface 20 is constructed as an axial carrier (disc) mounted to rotor 15. Alternative implementations include forming axial target surface 20 (including one or more conductive targets) on a corresponding surface of rotor 15, and using existing conductive elements of a surface of rotor 15 (such that the rotor surface provides the axial target surface). The target segment(s) can be formed onto axial target surface 20 (however formed) as separate conductive elements, or by conductive patterning.

Figure 2A:
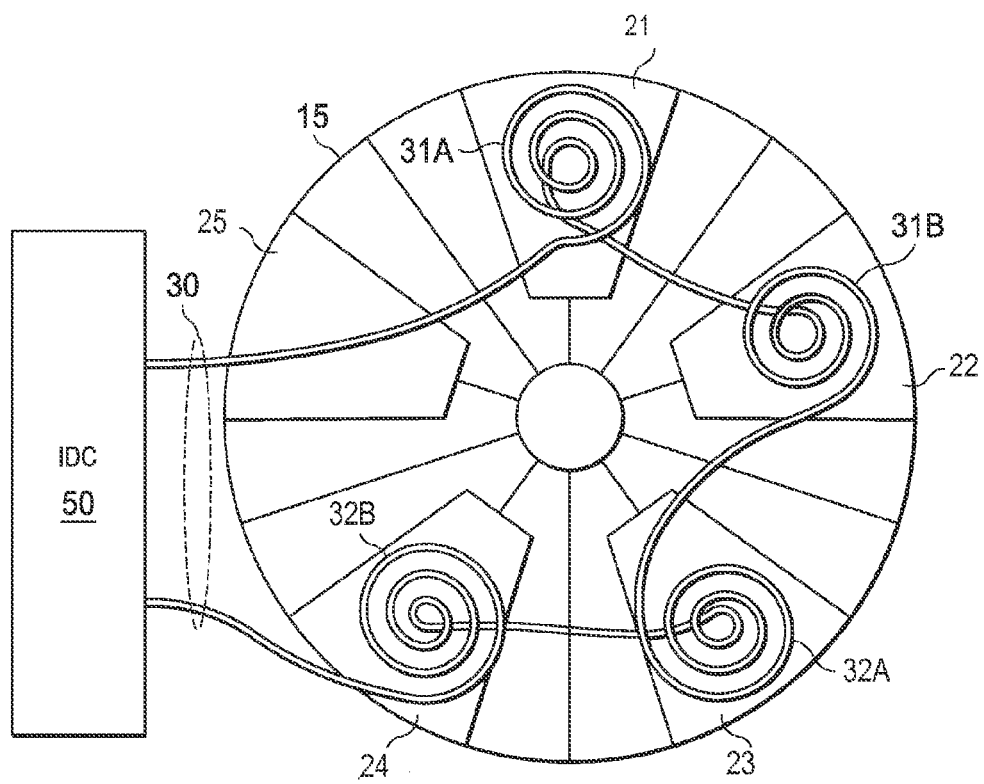
FIGS. 2A/2B/2C illustrate an example functional embodiment of a rotational sensing system, configured for reduced sensitivity to common mode EMI, including paired sense coils 31A/31B and 32A/32B, wound with opposite polarity.

Referring to FIG. 1, and the example implementations in FIGS. 2A/2B and 3A, a rotational sensing system includes an axial target surface 20 (with multiple target segments), an inductive sensor 30 (with multiple sense coils), and an inductance-to-digital converter (IDC) 50.

Axial target surface 20 is configured for axial rotation with rotor 15, and includes one or more conductive target segment(s). Inductive sensor 30 is mounted within motor 10, adjacent axial target surface 20, and includes one or more inductive sense coil(s) that is/are substantially parallel to and spaced from the axial target surface. Rotor rotation causes the target segment(s) to rotate laterally under the sense coil(s) each rotor rotation cycle.

Figure 3A:
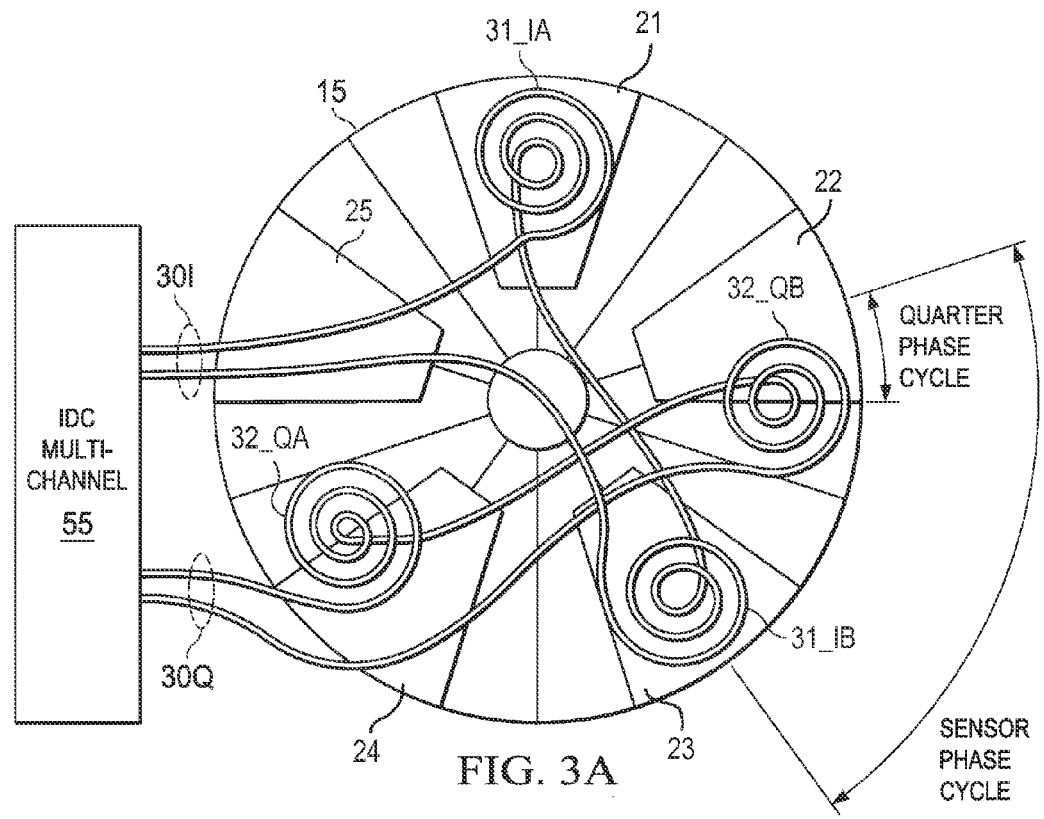
FIGS. 3A and 3B illustrate an example functional embodiment of a rotational sensing system, configured for directional sensing.

In the example functional embodiments illustrated in FIGS. 2A/2B and 3A, the axial target surface is configured with multiple, evenly spaced target segments 21-25, and inductive sensor 30 is configured with multiple sense coils: in FIGS. 2A/2B, two oppositely-wound paired sense coils 31A/31B and 32A/32B; and in FIG. 3A, oppositely-wound and phase-shifted I and Q paired sense coils 31_IA/31_IB and 32_QA/32_QB. Rotor rotation is clockwise, and each rotor rotation cycle, each target segment rotates laterally under each sense coil.

IDC 50 is coupled to the inductive sense coil(s). In FIGS. 2A/2B, IDC 50 is configured with a single channel 30 series coupled to coils 31A/31B and 32A/32B. In FIG. 3A, IDC 50 is configured with dual I/Q channels 30I/30Q coupled respectively to the I and Q paired sense coils 31_IA/31_IB and 32_QA/32_QB, each oppositely wound arranged with an IQ offset (illustrated as an example quarter phase cycle offset).

IDC 50 represents sensor electronics configured for sensor excitation, and sensor response acquisition (measurement/readout) and conversion to sensor response data representative of rotational information (such as sensor readout data samples). IDC 50 drives AC excitation current to the sense coil(s) to project a time-varying magnetic sensing field (B-field) toward the rotating axial target surface. IDC 50 acquires sensor response measurements corresponding to sensor response for the sense coil(s) in successive sensor phase cycles. IDC 50 converts the analog sensor response measurement/readout to sensor response data representative of rotation information for the rotating axial target surface (which correlates to the sensor response measurement/readout). IDC implementations can require sensor response measurements with a minimum total inductance that cannot be provided by the sense coil(s), in which case the sense coil(s) can be coupled to the inductive transducer through an additional inductance (such as an external inductor).

The sensor response data/information can be used, for example by a rotation processing unit (such as an MCU), to process/generate rotational information such as rotational frequency, angle and (in some embodiments) direction.

As an example implementation, a rotational sensing system according to this Disclosure can be implemented based on resonant inductive sensing in which inductive sensor 30 and IDC 50 are configured for resonant sensing. Inductive sensor 30 can be configured with a sensor resonator circuit including one or more series-coupled sense coil inductor(s), with a series/parallel resonator capacitor. The sense coil inductor(s) and a series/parallel resonator capacitor form a sensor resonator tank circuit (which can be configured with a separate series/external inductor to supply a minimum effective inductance readout to IDC50). Losses in the sensor resonator (LC tank circuit) can be characterized by a resistance Rs in series with the sense coil inductor(s), and referred to as sensor losses.

For sensor excitation, IDC 50 can be configured to drive the sensor resonator to maintain a resonance state of sustained (steady-state) oscillation. A driven resonator sense coil inductor projects a sensing B-field, which induces eddy currents in a target segment that rotates through the projected B-field. For implementations with multiple series coupled sense coil inductors, IDC 50 drives the multi-coil sensor resonator, so that each sense coil inductor generates a projected sensing B-field to the rotating axial target surface.

For sensor response acquisition, IDC 50 can be configured to acquire measurement/readout corresponding to sensor (resonator) response to the rotating target segment(s), as reflected in changes in the resonance state of the sensor resonator. For example, sensor resonator response can be based on either measuring eddy current losses manifested as a change in sensor resonator losses, or measuring a change in sense coil inductance (due to a change in eddy current back emf), manifested as a change in resonator frequency. In the case of eddy current losses, the sensor resonator losses can be characterized by series resistance Rs, or an equivalent resonator parallel impedance Rp (Rp=(1/Rs)*(L/C)), with changes in total sensor resonator impedance (1/Rp), which is a function of both inductance and resistance, measured as a change in the negative impedance (−1/Rp) required to counterbalance sensor resonator impedance, and maintain sensor resonance (sustained oscillation). In the case of sensor resonator inductance, changes in back emf caused by the induced eddy currents effectively changes sensor (coil) inductance, which is manifested as a corresponding change in resonator oscillation frequency required to maintain sensor resonance (sustained oscillation).

Independent of the method of eddy current sensing (based on resonant inductive sensing, or otherwise), a resonant sensing system according to this Disclosure, including Sensor 30 and IDC 50, can be configured for sensor response readout based on either eddy current losses in the conductive target segments reflected as a change in sensor losses, or eddy_current-induced back emf that changes effective sensor inductance. Design considerations include required sensitivity and tolerance for temperature effect: eddy current sensing based on sensor eddy current losses is more sensitive, but sensor inductance is less susceptible to temperature effects.

Figure 2B:
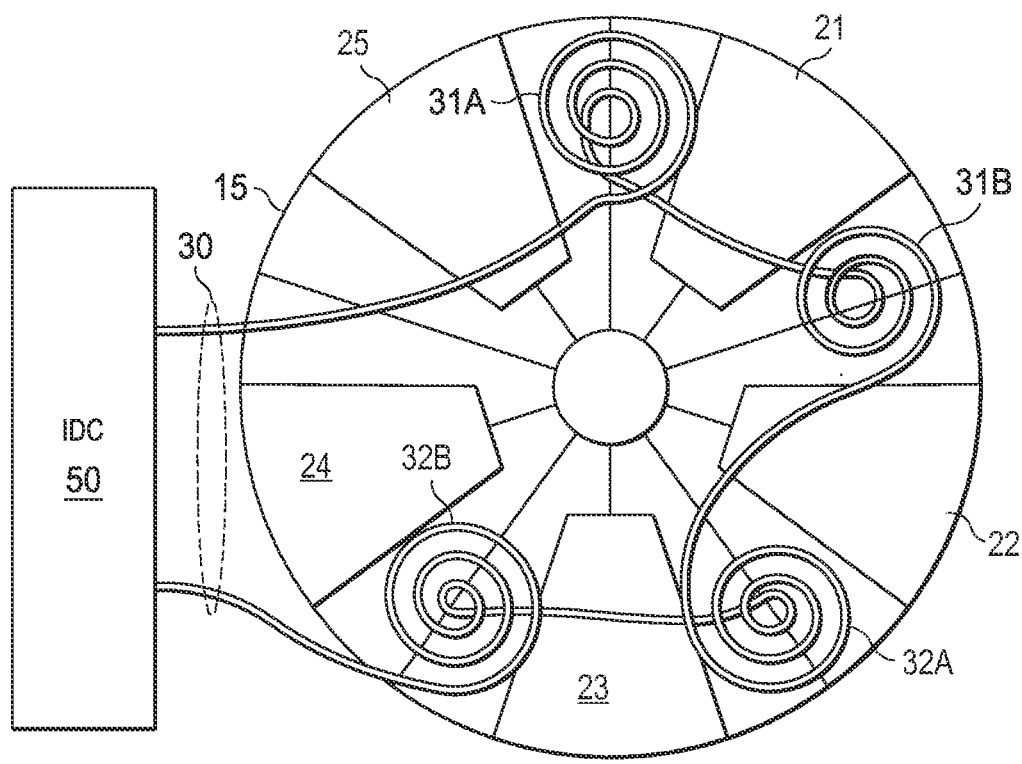
FIG. 2B illustrates, after rotor rotation (clockwise), paired sense coils 31A/31B are misaligned with target segments 21/22, and paired sense coils 32A/32B are misaligned with target segments 23/24.
Figure 2C:
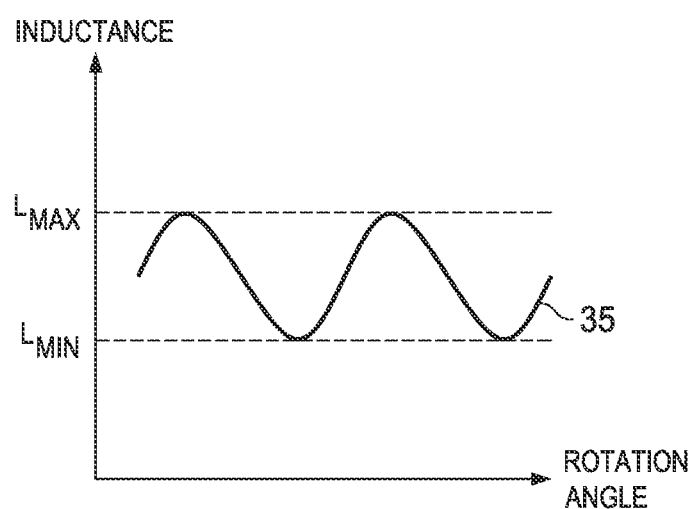
FIG. 2C illustrates an example waveform 35 cycling between $L_{MIN}$ and $L_{MAX}$ in successive sinusoidal sensor phase cycles.
Figure 3B:
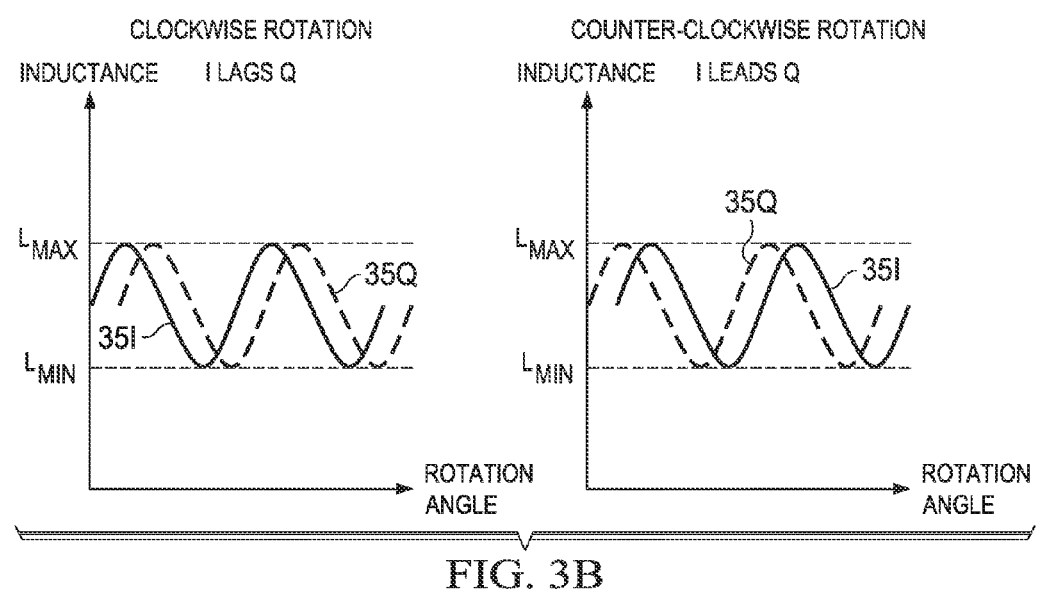

The following Description uses sensor inductance as a convenient reference for sensor response (for example, $L_{MIN}$ and $L_{MAX}$ as used in FIGS. 2C and 3B, and the related Description). Unless the context clearly indicates that inductance is intended, reference to sensor response based on inductance, and in particular $L_{MIN}$ and $L_{MAX}$, should be interpreted as reference to sensor response in general, including changes in sensor inductance based on back emf caused by induced eddy currents, but also including changes in sensor losses resulting from induced eddy current losses, and also including changes in total sensor impedance based on changes in sensor resistance and sensor inductance. According to this Disclosure, including the Claims, sensor response is independent of how it is characterized, manifested or measured.

Referring to FIGS. 2A/2B, and the example sensor response waveform in FIG. 2C, in response to the rotation of a target segment relative to the sense coil(s) and projected B-field(s), the sensor response is characterized by a sensor phase cycle. In the example functional embodiments of FIGS. 2A/2B, rotor rotation is clockwise, so that, for example, target segment 21 rotates clockwise under sense coil 31A, so that, in FIG. 2A target segment 21 is aligned with sense coil 31A (and its projected B-field), and in FIG. 2B they are misaligned.

A sensor response phase cycle initiates at phase_cycle_$L_{MIN}$ in which a sense coil is aligned with a target segment (FIG. 2A, 31A/21) to output a minimum sensor response $L_{MIN}$ (FIG. 2C, 35), corresponding to maximum induced eddy current (maximum eddy current losses). The sensor phase cycle transitions through a phase_cycle_$L_{MAX}$ where the sense coil (FIG. 2B, 31A) is misaligned with the target segment (FIG. 2B, 21) to output a maximum sensor response $L_{MAX}$ (FIG. 2C, 35), corresponding to minimum induced eddy current (minimum eddy current losses). The sensor phase cycle ends with the initiation of a next sensor phase cycle at phase_cycle_$L_{MIN}$. The number of sensor phase cycles in a rotor rotation cycle corresponds to the number of target segments.

IDC 50 is configured to acquire sensor response measurements corresponding to sensor response for the sense coil(s) in successive sensor phase cycles, each including transitioning between phase_cycle_$L_{MIN}$ and phase_cycle_$L_{MAX}$. IDC 50 converts the sensor response measurements from successive sensor phase cycles to sensor response data corresponding to rotation information for the rotating axial target surface that correlates to the sensor response measurements.

The example implementations illustrated in FIGS. 2A/2B (with an example sensor response waveform in FIG. 2C) and FIG. 3A (with an example sensor response waveform in FIG. 3B) illustrate rotational sensing using multiple target segments and multiple sense coils. The multiple target segments 21-25 are evenly spaced on the axial target surface. The number of sense coils is preferably equal to the number of target segments. The multiple sense coils are arranged relative to the multiple target segments such that sensor phase cycles are synchronized, so that sensor responses are synchronized.

Specifically, the multiple target segments 21-25 are evenly spaced on the axial target surface, and arranged relative to the sense coil(s) such that the sensor response from the inductive sensor for the sense coil(s) throughout a rotor rotation cycle is a substantially sinusoidal sensor response signal that cycles between phase_cycle_$L_{MIN}$ and phase_cycle_$L_{MAX}$ in a succession of sensor 360° phase cycles, as illustrated in the example sensor response waveforms in FIG. 2C, 35 and FIG. 3B, 35I/35Q.

FIGS. 2A/2B and 3A are functional illustrations not drawn to scale. The number, dimensions, placement, and shapes of the target segments and sense coils will depend on the dimensions of the axial target surface (rotor), and represent design trade-offs including resolution, sensitivity and EMI. For example, while rotation sensing according to this Disclosure only requires a single target and a single sense coil (for example, in applications where only rotation counting is required), multiple targets can be used to increase rotational/angular resolution (i.e., resolving the phase angle of the rotor within a phase cycle determined by the number/arrangement of target segments), and, for evenly spaced target segments, enable a sinusoidal-type sensor response. Multiple sense coils can be used to increase sensitivity (readout magnitude) through additive sensor responses from the multiple sense coils with synchronized sensor response phase cycles. Increasing the number of target segments increases resolution, but requires decreasing sense coil size, which decreases sense coil inductance, and can impact manufacturability. Increasing the number of sense coils decreases through averaging the impact of system mechanical noise, such as due to vibration and mechanical tolerances (such as affecting coil-to-surface distance). Thus, advantageous configurations can include a maximum number of target segments and corresponding number of sense coils, although EMI consideration can require configurations with an even number of sense coils (oppositely wound), and so that this number of target segments can be limited to the number of sense coils plus one.

FIGS. 2A/2B/2C illustrate an example functional embodiment of a rotational sensing system, configured for reduced sensitivity to common mode EMI. Specifically, the rotational sensing system is configured with one or more paired sense coils, wound with opposite polarity, and at least one target segment pair, arranged on the axial target surface such that the sensor phase cycles for the paired sense coils are synchronized relative to the target segment pair.

In the example implementation illustrated in FIGS. 2A/2B, multiple target segments 21-25 are evenly spaced on the axial target surface incorporated with rotor 15. Inductive sensor 30 includes two paired sense coils 31A/31B and 32A/32B (oppositely wound). The paired sense coils 31A/31B and 32A/32B are arranged relative to target segments 21-25 such that the sensor phase cycles for the paired sense coils are synchronized (and additive for increased readout magnitude).

Referring to FIG. 2A, as illustrated, rotor 15 has rotated such that paired sense coils 31A/31B are aligned with target segments 21/22, and paired sense coils 32A/32B are aligned with target segments 23 and 24. Referring to FIG. 2B, as illustrated, rotor 15 has rotated (clockwise) such that paired sense coils 31A/31B are now misaligned with target segments 21/22, and paired sense coils 32A/32B are now misaligned with target segments 23 and 24.

Referring to the example sensor response waveform in FIG. 2C, the sensor response of the paired sense coils 31A/31B and 32A/32B throughout a rotor rotation cycle is a substantially sinusoidal sensor response signal 35 that cycles between phase_cycle_$L_{MIN}$ and phase_cycle_$L_{MAX}$ as a succession of sensor 360° phase cycles.

FIGS. 3A and 3B illustrate an example functional embodiment of a rotational sensing system, configured for directional sensing (as well as reduced sensitivity to common mode EMI). Specifically, the rotational sensing system is configured with one or more sets of I and Q paired sense coils (oppositely wound) arranged relative to the target segment(s) such that the respective sensor I and Q phase cycles are offset by an IQ phase offset: (a) for rotation in one direction, the sensor I phase cycle lags the sensor Q phase cycle, and (b) for rotation in the other direction, the sensor I phase cycle leads the sensor Q phase cycle.

In the example implementation illustrated in FIG. 3A, multiple target segments 21-25 are evenly spaced on the axial target surface of rotor 15. Separate I and Q paired sense coils 31_IA/31_IB and 32_QA/32_QB (oppositely wound) are arranged with an IQ phase offset of one quarter (90°) of the sensor I and Q 360° phase cycle. At the illustrated point in the rotation cycle of rotor 15, the I sense coils 31_IA/31_IB are respectively aligned with target segments 21 and 23, and the Q sense coils 32_QA/32_QB are respectively offset relative to target segments 22 and 24 by the IQ phase offset of one quarter (90°) of the sensor I and Q 360° phase cycle.

Referring to the example sensor response waveforms in FIG. 3B, for the I and Q paired sense coils 31_IA/31_IB and 32_QA/32_QB (oppositely wound), the I and Q sensor responses throughout a rotor rotation cycle are respective substantially sinusoidal I and Q sensor response signals 35I and 35Q, each cycling between phase_cycle_$L_{MIN}$ and phase_cycle_$L_{MAX}$ in a succession of sensor I and Q 360° phase cycles, offset in phase by the IQ phase offset of one quarter (90°) of the sensor I and Q 360° phase cycle. For clockwise rotation, sensor response sinusoid 35I lags sensor response sinusoid 35Q, and for counter-clockwise rotation sensor response sinusoid 35I leads sensor response sinusoid 35Q.

IDC 50 converts the I and Q sensor response signals to sensor response data corresponding to rotation direction information for the rotating axial target surface.

The foregoing describes various aspects and technical features of a rotational sensing system suitable for use in sensing rotation of a rotor. The rotational sensing system includes an axial target surface incorporated into the rotor, an inductive sensor configured for sensing rotor rotation, and an IDC unit configured to capture sensor response measurements/readings representative of rotor rotational information. The axial target surface is configured for axial rotation with the rotor, and includes at least one conductive target segment. The inductive sensor is mounted adjacent the axial target surface, including at least one inductive sense coil that is substantially parallel to and spaced from the axial target surface, such that rotor rotation causes the target segment to rotate laterally under the sense coil each rotor rotation cycle. The IDC unit is coupled to the at least one sense coil, and configured to drive excitation current to the sense coil to project a time-varying magnetic sensing field (B-field) toward the axial target surface, thereby inducing eddy currents in the target segment as it rotates under the sense coil. In response to the rotation of the at least one target segment relative to the at least one sense coil and its projected B-field, the inductive sensor generates a sensor response characterized by a sensor phase cycle: (a) the sensor phase cycle initiates at a phase_cycle_$L_{MIN}$ in which the sense coil aligned with the target segment to output a minimum sensor response $L_{MIN}$ corresponding to maximum induced eddy current; (b) the sensor phase cycle transitions through a phase_cycle_$L_{MAX}$ in which the sense coil is misaligned with the target segment to output a maximum sensor response $L_{MAX}$ corresponding to minimum induced eddy current; and (c) the sensor phase cycle ends with the initiation of a next sensor phase cycle at phase_cycle_$L_{MIN}$; where (d) the number of sensor phase cycles in a rotor rotation cycle corresponds to the number of target segments. The IDC unit is further configured to: (a) acquire sensor response measurements corresponding to sensor response for the at least one sense coil in successive sensor phase cycles including phase_cycle_$L_{MIN}$ and phase_cycle_$L_{MAX}$; and (b) convert the sensor response measurements to sensor response data representative of rotation information for the rotating axial target surface that correlates to the sensor response measurements. Rotational information can corresponds to at least one of rotational frequency and rotational angle In various embodiments, the inductive sensor can include at least one sense coil pair with first and second sense coils wound with opposite polarity, and at least one target segment pair, arranged on the axial target surface such that the sensor phase cycles for the paired sense coils are synchronized relative to the target segment pair. The axial target surface can include multiple target segments evenly spaced on the axial target surface, such that the sensor response of the paired sense coils throughout a rotor rotation cycle is a substantially sinusoidal sensor response signal that cycles between phase_cycle_$L_{MIN}$ and phase_cycle_$L_{MAX}$ as a succession of sensor 360° phase cycles.

In other embodiments, the inductive sensor can include at least one set of I and Q sense coils arranged relative to the at least one target segment such that the respective sensor I and Q phase cycles are offset by an IQ phase offset, such that: (a) for rotation in one direction, the sensor I phase cycle lags the sensor Q phase cycle, and (b) for rotation in the other direction, the sensor I phase cycle leads the sensor Q phase cycle. The IDC unit is further configured to convert I and Q sensor response measurements to sensor response data corresponding to rotation direction information for the rotating axial target surface. The axial target surface can include multiple target segments evenly spaced on the axial target surface, such that the I and Q sensor responses of the I and Q sense coils throughout a rotor rotation cycle are substantially sinusoidal I and Q sensor response signals, that each cycle between phase_cycle_$L_{MIN}$ and phase_cycle_$L_{MAX}$ in a succession of sensor I and Q 360° phase cycles, respectively offset in phase by the IQ phase offset (such as substantially a quarter of the sensor I and Q 360° phase cycle).

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications can be used by ordinarily skilled artisans as a basis for modifications, substitutions and alternatives to construct other embodiments, including adaptations for other applications.

The invention claimed is:

1. A rotational sensing system suitable for use in sensing rotation of a rotor, comprising:
   an axial target surface arranged for axial rotation with the rotor, and including at least one conductive target segment; and
   an inductive sensor mounted adjacent the axial target surface, including at least one inductive sense coil that is substantially parallel to and spaced from the axial target surface;
   such that rotor rotation causes the at least one target segment to rotate laterally under the at least one sense coil each rotor rotation cycle; and
   an inductance-to-digital converter (IDC) coupled to the at least one sense coil, to drive excitation current to the sense coil to project a time-varying magnetic sensing field (B-field) toward the axial target surface, to induce eddy currents in the target segment as it rotates under the sense coil;
   the inductive sensor to generate, in response to the rotation of the at least one target segment relative to the at least one sense coil and its projected B-field, a sensor response with a sensor phase cycle having:
   a phase_cycle_$L_{MIN}$ with the sense coil aligned with the target segment to output a minimum sensor response $L_{MIN}$ corresponding to a maximum induced eddy current;
   a phase_cycle_$L_{MAX}$ with the sense coil misaligned with the target segment to output a maximum sensor response $L_{MAX}$ corresponding to minimum induced eddy current, and
   where a number of sensor phase cycles in a rotor rotation cycle corresponds to the number of target segments; and
   the IDC
   to acquire sensor response measurements corresponding to sensor response for the at least one sense coil in successive sensor phase cycles including phase_cycle_$L_{MIN}$ and phase_cycle_$L_{MAX}$, and
   to convert the sensor response measurements to sensor response data representative of rotation information for the rotating axial target surface that correlates to the sensor response measurements.

2. The rotational sensing system of claim 1:
   wherein the axial target surface includes multiple target segments evenly spaced on the axial target surface;
   wherein the at least one sense coil is arranged relative to the multiple target segments such that the sensor response from the inductive sensor for the sense coil throughout a rotor rotation cycle is a substantially sinusoidal sensor response signal that cycles between phase_cycle_$L_{MIN}$ and phase_cycle_$L_{MAX}$ in a succession of sensor 360° phase cycles; and
   wherein the sensor response data corresponds to at least one of rotational frequency and rotational angle.

3. The rotational sensing system of claim 2:
   wherein the inductive sensor includes multiple sense coils, in number equal to or less than the number of target segments; and
   wherein that multiple sense coils are arranged relative to the multiple target segments such that:
   sensor phase cycles are synchronized, so that
   sensor responses are synchronized.

4. The rotational sensing system of claim 1:
   wherein the inductive sensor includes at least one sense coil pair with first and second sense coils wound with opposite polarity; and wherein the axial target surface includes at least one target segment pair, arranged on the axial target surface such that the sensor phase cycles for the paired sense coils are synchronized relative to the at least one target segment pair.

5. The rotational sensing system of claim 4:
wherein the axial target surface includes multiple target segments evenly spaced on the axial target surface;
such that the sensor response of the paired sense coils throughout a rotor rotation cycle is a substantially sinusoidal sensor response signal that cycles between phase_cycle_$L_{MIN}$ and phase_cycle_$L_{MAX}$ as a succession of sensor 360° phase cycles; and
wherein the rotational information corresponds to at least one of rotational frequency and rotational angle.

6. The rotational sensing system of claim 1, wherein the rotor and the axial target surface can rotate in either direction, and:
wherein the inductive sensor includes at least one set of I and Q sense coils arranged relative to the at least one target segment such that the respective sensor I and Q phase cycles are offset by an IQ phase offset;
such that,
for rotation in one direction, the sensor I phase cycle lags the sensor Q phase cycle, and
for rotation in the other direction, the sensor I phase cycle leads the sensor Q phase cycle; and
the IDC to convert I and Q sensor response measurements to sensor response data corresponding to rotation direction information for the rotating axial target surface.

7. The rotational sensing system of claim 6:
wherein the axial target surface includes multiple target segments evenly spaced on the axial target surface;
such that the I and Q sensor responses of the I and Q sense coils throughout a rotor rotation cycle are substantially sinusoidal I and Q sensor response signals, that each cycle between phase_cycle_$L_{MIN}$ and phase_cycle_$L_{MAX}$ in a succession of sensor I and Q 360° phase cycles, respectively offset in phase by the IQ phase offset.

8. The rotational sensing system of claim 7, wherein the IQ phase offset is substantially a quarter (90°) of the sensor I and Q 360° phase cycle.

9. The rotational sensing system of claim 1, wherein the rotor is incorporated in an electric motor.

10. The method of claim 1, wherein the rotor and the axial target surface can rotate in either direction, and:
wherein the inductive sensor includes at least one set of I and Q sense coils arranged relative to the at least one target segment such that the respective sensor I and Q phase cycles are offset by an IQ phase offset;
such that,
for rotation in one direction, the sensor I phase cycle lags the sensor Q phase cycle, and
for rotation in the other direction, the sensor I phase cycle leads the sensor Q phase cycle; and
wherein the axial target surface includes multiple target segments evenly spaced on the axial target surface, such that the I and Q sensor responses of the I and Q sense coils throughout a rotor rotation cycle are substantially sinusoidal I and Q sensor response signals, that each cycle between phase_cycle_$L_{MIN}$ and phase_cycle_$L_{MAX}$ in a succession of sensor I and Q 360° phase cycles, respectively offset in phase by the IQ phase offset; and further comprising converting I and Q sensor response measurements to sensor response data corresponding to rotation direction information for the rotating axial target surface.

11. An inductance-to-digital converters (IDC) circuit for use in a system for sensing rotation of a rotor, the system including an axial target surface arranged for axial rotation with the rotor, and including at least one conductive target segment, the system including an inductive sensor mounted adjacent the axial target surface, including at least one inductive sense coil that is substantially parallel to and spaced from the axial target surface, such that rotor rotation causes the at least one target segment to rotate laterally under the at least one sense coil each rotor rotation cycle, the IDC circuit coupled to the at least one inductive sense coil, the circuit comprising:
excitation circuitry to drive excitation current to the sense coil to project a time-varying magnetic sensing field (B-field) toward the axial target surface, thereby inducing eddy currents in the target segment as it rotates under the sense coil;
in response to the rotation of the target segment relative to the sense coil and its projected B-field, the inductive sensor generating a sensor response with a sensor phase cycle having:
a phase_cycle_$L_{MIN}$ with the sense coil aligned with the target segment to output a minimum sensor response $L_{MIN}$ corresponding to maximum induced eddy current;
a phase_cycle_$L_{MAX}$ with the sense coil misaligned with the target segment to output a maximum sensor response $L_{MAX}$ corresponding to minimum induced eddy current, and
where a number of sensor phase cycles in a rotor rotation cycle corresponds to the number of target segments; and
acquisition circuitry to acquire sensor response measurements corresponding to sensor response for the at least one sense coil in successive sensor phase cycles including phase_cycle_$L_{MIN}$ and phase_cycle_$L_{MAX}$; and
conversion circuitry to convert the sensor response measurements to sensor response data representative of rotation information for the rotating axial target surface that correlates to the sensor response measurements.

12. The circuit of claim 11:
wherein the axial target surface includes multiple target segments evenly spaced on the axial target surface; and
wherein the at least one sense coil is arranged relative to the multiple target segments such that the sensor response from the inductive sensor for the sense coil throughout a rotor rotation cycle is a substantially sinusoidal sensor response signal that cycles between phase_cycle_$L_{MIN}$ and phase_cycle_$L_{MAX}$ in a succession of sensor 360° phase cycles; and
wherein the sensor response data corresponds to at least one of rotational frequency and rotational angle.

13. The circuit of claim 12:
wherein the inductive sensor includes multiple sense coils, in number equal to or less than the number of target segments; and
wherein that multiple sense coils are arranged relative to the multiple target segments such that:
sensor phase cycles are synchronized, so that sensor responses are synchronized.

14. The circuit of claim 11:
wherein the inductive sensor includes at least one sense coil pair with first and second sense coils wound with opposite polarity; and
wherein the axial target surface includes at least one target segment pair, arranged on the axial target surface such that the sensor phase cycles for the paired sense coils are synchronized relative to the at least one target segment pair.

15. The circuit of claim 14,
wherein the axial target surface includes multiple target segments evenly spaced on the axial target surface;
such that the sensor response of the paired sense coils throughout a rotor rotation cycle is a substantially sinusoidal sensor response signal that cycles between phase_cycle_$L_{MIN}$ and phase_cycle_$L_{MAX}$ as a succession of sensor 360° phase cycles; and
wherein the rotational information corresponds to at least one of rotational frequency and rotational angle.

16. The circuit of claim 11, wherein the rotor and the axial target surface can rotate in either direction, and further comprising:
at least one set of I and Q sense coils arranged relative to the at least one target segment such that the respective sensor I and Q phase cycles are offset by an IQ phase offset;
such that,
for rotation in one direction, the sensor I phase cycle lags the sensor Q phase cycle, and
for rotation in the other direction, the sensor I phase cycle leads the sensor Q phase cycle; and
the conversion circuit to convert I and Q sensor response measurements to sensor response data corresponding to rotation direction information for the rotating axial target surface.

17. The circuit of claim 1,
wherein the axial target surface includes multiple target segments evenly spaced on the axial target surface;
such that the I and Q sensor responses of the I and Q sense coils throughout a rotor rotation cycle are substantially sinusoidal I and Q sensor response signals, that each cycle between phase_cycle_$L_{MIN}$ and phase_cycle_$L_{MAX}$ in a succession of sensor I and Q 360° phase cycles, respectively offset in phase by the IQ phase offset.

18. A method for sensing rotation of a rotor, useable in a rotational sensing system that includes an axial target surface arranged for axial rotation with the rotor, and including at least one conductive target segment, and the rotational sensing system includes an inductive sensor mounted adjacent the axial target surface, and including at least one inductive sense coil that is substantially parallel to and spaced from the axial target surface, such that rotor rotation causes the target segment to rotate laterally under the at least one sense coil each rotor rotation cycle, the method comprising:
driving excitation current to the sense coil to project a time-varying magnetic sensing field (B-field) toward the axial target surface, thereby inducing eddy currents in the target segment as it rotates under the sense coil;
the inductive sensor generating, in response to the rotation of the at least one target segment relative to the at least one sense coil and its projected B-field, a sensor response with a sensor phase cycle having:
a phase_cycle_$L_{MIN}$ in which the sense coil aligned with the target segment to output a minimum sensor response $L_{MIN}$ corresponding to maximum induced eddy current;
phase_cycle_$L_{MAX}$ in which the sense coil is misaligned with the target segment to output a maximum sensor response $L_{MAX}$ corresponding to minimum induced eddy current, and
where a number of sensor phase cycles in a rotor rotation cycle corresponds to the number of target segments; and
acquiring sensor response measurements corresponding to sensor response for the at least one sense coil in successive sensor phase cycles including phase_cycle_$L_{MIN}$ and phase_cycle_$L_{MAX}$, and
converting the sensor response measurements to sensor response data representative of rotation information for the rotating axial target surface that correlates to the sensor response measurements.

19. The method of claim 18:
wherein the axial target surface includes multiple target segments evenly spaced on the axial target surface;
wherein the inductive sensor includes multiple sense coils, in number equal to or less than the number of target segments, and arranged relative to the multiple target segments such that:
sensor phase cycles are synchronized, so that
sensor responses are synchronized; and
wherein the multiple sense coils and the multiple target segments are arranged such that the sensor response from the multi-coil inductive sensor throughout a rotor rotation cycle is a substantially sinusoidal sensor response signal that cycles between phase_cycle_$L_{MIN}$ and phase_cycle_$L_{MAX}$ in a succession of sensor 360° phase cycles; and
wherein the sensor response data corresponds to at least one of rotational frequency and rotational angle.

20. The method of claim 18:
wherein the inductive sensor includes at least one sense coil pair with first and second sense coils wound with opposite polarity; and
wherein the axial target surface includes multiple target segments evenly spaced on the axial target surface;
such that the sensor response of the paired sense coils throughout a rotor rotation cycle is a substantially sinusoidal sensor response signal that cycles between phase_cycle_$L_{MIN}$ and phase_cycle_$L_{MAX}$ as a succession of sensor 360° phase cycles; and
wherein the rotational information corresponds to at least one of rotational frequency and rotational angle.

\* \* \* \* \*